Patented June 19, 1945

2,378,818

UNITED STATES PATENT OFFICE 2,378,818

GREASE COMPOSITION

John C. Zimmer, Union, and Arnold J. Morway, Clark Township, Union County, N. J., assignor to Standard Oil Development Company, a corporation of Delaware No Drawing. Application July 19, 1941,
Serial No. 403,158

10 Claims. (Cl. 252—39)

The present invention is concerned with the production of improved grease compositions. The invention more particularly relates to a plastic lubricating grease composition which is particularly adapted for use in bearings and other parts of machines which are subject to sudden shock, and also the compositions of this invention are adapted for use in the lubrication of metal to metal connections and bearings which are subject to either continuous or intermittent contact with either hot or cold water. The invention contemplates compositions comprising a mineral oil base, a metallic soap and a petroleum resin.

Soap base greases of varying composition and consistency enjoy a wide variety of uses in the art because many mechanisms are not satisfactorily constructed to retain fluid oils, and the consistency requirements of different mechanisms are almost as varied as the mechanisms themselves, and one type of grease may not and generally is not satisfactory when used for a purpose for which it was not designed. For certain types of uses it is desired to have a grease which is viscous, not appreciably affected by water, and with sufficient cohesion and adhesion to metals that it is not displaced by either pressure or sudden shocks or exposure to a stream of water. Also, the grease must contain sufficient soap to effect its yield value without however being so bodied to prevent being dispensed by the usual pressure equipment.

It has been previously believed that the consistency of greases could be built up by increasing the amount of soap in the grease.

However, it has long been recognized that the actual lubrication of rubbing surfaces must be accomplished by a fluid film if satisfactory results are to be obtained. Not so generally recognized is the fact that when greases are employed, the lubrication must be accomplished by a fluid film, rather than soap structure itself.

The apparent viscosity of a soap thickened mineral oil or grease is not fixed under the conditions of temperature and pressure as is that of an uncompounded mineral oil, but varies with the rate of shear or velocity of flow. The term "rate of shear" is the denominator of the usual Poiseuille equation:

$$K = \frac{\frac{PR}{2L}}{\frac{4Q}{\pi R^3}}$$

where $K$=viscosity, $P$=pressure, $R$=radius of capillary, $L$=length of capillary, and $Q$=flow rate.

The rate of shear is, therefore:

$$\frac{4Q}{\pi R^3}$$

These symbols are those conventional in the science of rheology.

By experimentation it has been shown that, as the rate of shear increases, the apparent viscosity of the grease approaches some limiting value, higher than, but of the same order of magnitude, as that of the base oil used in the grease. However, the apparent viscosity and consistency of the grease is limited by the mode of application. In most instances the grease is applied by means of a pressure gun and must therefore have an apparent viscosity low enough to flow since the usual dispensing equipment operates under relatively low rates of shear.

It is generally accepted in the art that the heavier, more viscous greases have better load bearing characteristics. That is to say, the heavier greases are not as easliy extruded by the pressure on the bearing and therefore the usual greases which may be applied by means of a pressure gun do not have sufficient body to remain in place and furnish lubrication in the bearing. Therefore, by increasing the viscosity of the oil, without increasing the soap content, a heavy viscous grease is formed which may be handled in the ordinary pressure equipment without difficulty at low rates of shear, but which has the lubricating properties and film strength of a high viscosity material under high rates of shear. The effect of increasing the soap content on the apparent viscosity at various rates of shear, the oil viscosity remaining unchanged, is shown in the following table: thus showing that at low rates of shear, the soap has a noticeable effect on the apparent viscosity, but as the rate of shear, or stress, increases, the effect of the soap concentration on the apparent viscosity diminishes.

TABLE I

Calcium soap lubricating greases containing same viscosity mineral oil

| Apparent viscosity V. S. rate of shear | | |
|---|---|---|
| Rate of shear seconds−1 | 10.1% calcium soap, apparent viscosity poises | 22.5% calcium soap, apparent viscosity poises |
| 0.1 | 10,000 | 100,000 |
| 1.0 | 4,000 | 14,000 |
| 10.0 | 650 | 6,000 |
| 100.0 | 70 | 700 |
| 1,000.0 | 12 | 100 |
| 10,000.0 | 7 | 30 |
| 100,000.0 | 4 | 10 |
| 1,000,000.0 | 3 | 8 |

The effect on some greases exerted by the presence of water is a very serious drawback. Sodium soap greases generally are quite soluble in water and are easily washed away. Calcium, magnesium, and barium greases, while relatively insoluble in water, are nevertheless adversely affected by the presence of large amounts of water. Either continuous or intermittent application of water to a surface coated with a calcium or barium soap grease will eventually dislodge the grease due to the scouring or scrubbing action of the water.

The soap greases of the prior art also are lacking in cohesion and adhesiveness. Cohesion is marked by the ability of a mass of grease to cling together tenaciously. Adhesiveness is evidenced by the ability of the grease to resist removal or wiping off from a smooth metallic or other surface. The ordinary soap greases spatter in all directions when subjected to sudden shock and are easily removed from a smooth surface by wiping, while greases containing petroleum resins are not readily removed but tend to stick tenaciously to the surfaces upon which they are applied.

An object of the present invention is to improve the apparent viscosity and thereby improving the dispensability in the usual dispensing equipment of a compounded soap grease. Another object is to improve the cohesiveness and adhesiveness of soap greases. Still another object of the present invention is to improve upon the resistance to the action of water offered by soap greases. These and other objects of the invention will be apparent from the following description of the invention.

It has now been found that the addition of petroleum hydrocarbon resins to greases compounded from petroleum lubricating oils and metallic soaps greatly improves the apparent viscosity, cohesiveness, adhesiveness and resistance to the action of water of the resulting metallic soap greases. Petroleum hydrocarbon resins are obtained by the propane extraction of petroleum oil residuums. Although petroleum oil residuum generally can be used as a source from which to obtain petroleum hydrocarbon resins, it is preferred to use the residuum of paraffinic base crudes and more particularly, those residuums known as paraffinic or Pennsylvania bright stock. The petroleum hydrocarbon resins may vary greatly in composition, depending upon the nature of the residuum and its previous treatment and upon the conditions of propane dilution and temperature for settling. These resins may be narrow cuts on the crude and consist predominantly of color bodies and hydrocarbons with high carbon-to-hydrogen ratios. When broader cuts are produced, the resin fraction may have associated with it lubricating fractions of high molecular weight. The petroleum hydrocarbon resins can be fractionated from dewaxed Pennsylvania Cylinder stock in the manner described by Graff and Forrest in Ind. and Eng. Chem., vol. 32 #3, page 294–298, March, 1940. The petroleum hydrocarbon resins thus obtained have a Saybolt Universal viscosity ranging from 900 to 5,000 seconds at 210° F. and a high viscosity index (Dean and Davis) of over 60. Appropriate choice within this range may be made to secure the desired apparent viscosity of the grease without sacrifice to cohesiveness, adhesiveness or resistance to the action of water. The petroleum hydrocarbon resins bay be incorporated in the soap grease in any proportions with beneficial results, but it is preferred to use from 1 to 150 parts of petroleum hydrocarbon to 100 parts of soap grease, depending on the viscosity of the resins.

In Table II is shown the effect on apparent viscosity by increasing the viscosity of the mineral oil in grease by the addition of petroleum hydrocarbon resins.

TABLE II

*Apparently viscosity V. S. rate of shear of greases having same worked penetration at 77° F. and different mineral oil viscosities*

[Worked penetration at 77° F.—285]

| Grease containing Mid-Continent type oil of 0.0547 poises at 210° F. and 0.413 poises at 100° F. | | Grease containing blend of Mid-Continent type oil and petroleum hydrocarbon resins [1] of 3.97 poises at 100° F. and 0.268 poises at 210° F. |
|---|---|---|
| Rate of shear reciprocal seconds | Apparent viscosity, poises | Apparent viscosity, poises |
| 500 | 24.20 | 53.00 |
| 1,000 | 16.60 | 41.50 |
| 5,000 | 5.40 | 25.20 |
| 10,000 | 4.05 | 19.30 |
| 50,000 | 1.90 | 10.35 |
| 100,000 | 1.53 | 6.75 |

[1] 5.98 poises at 210° F.

Any of the conventional metallic soap greases known to the art may be chosen for improvement following the practice of this invention. The metallic constituent of the soap may be any of the well known elements used for this purpose such as calcium, magnesium, sodium, aluminum, barium, or mixtures of these, etc. The negative radical of the metallic soap may be derived from any of the commonly used monobasic organic acids, or saponifiable fats such as stearic, oleic, hydrogenated, fish oil acids, naphthenic, etc., or tallow, lard oil, fish oil, horse fat, etc. Other additives, such as disinfectants, preservatives or perfumes, may be incorporated in the soap grease without involving invention or departing from the scope of the present invention. Although a wide range of lubricating oils may be employed as the lubricant in the grease, in general, the lubricating oil in a metallic soap grease comprises an oil having a viscosity in the range of from about 50 to 1200 seconds at 100° F. However, in preparing metallic soap greases, it is preferred to use a lubricating oil having a viscosity in the range from 100 to 600. Any of the conventional processes for compounding metallic soap greases may be employed, as for example, a prepared metallic soap may be blended into a lubricating oil or saponifiable fat may be neutralized or saponified, thus producing the metallic soap in situ in the lubricating oil.

The improved grease compositions of this invention may be compounded in either of two ways: first, a metallic soap grease prepared as outlined above may be blended with petroleum hydrocarbon resins, or, second, a solution of an organic acid and petroleum hydrocarbon resins in a lubricating oil may be heated with a neutralizing agent. A wide range of temperatures varying from about room temperature to just below the melting point are suitable for the blending of petroleum hydrocarbon resins into metallic soap greases, but it is preferred to use temperatures between room temperature and 200° F. The process of this invention may be made continuous by metering the proper proportions of the ingredients into a mixing pump and blending at an elevated temperature.

The concentration of petroleum hydrocarbon resins employed may vary considerably depending upon the particular metallic soap grease used and the properties desired in the resulting grease, but in general, it is preferred to use from about 1 to about 150 parts of hydrocarbon resins per hundred parts of metallic soap grease.

The following examples are given as being illustrative of this invention:

EXAMPLE 1

80 parts of a calcium soap grease prepared from animal fat, hydrated lime, water and a mineral lubricating oil of 300 vis. at 100° F. and 20 parts of petroleum hydrocarbon resins obtained from Pennsylvania bright stock by propane extraction were mixed together at room temperature and then heated to a temperature of from 120–150° F. This grease had an A. S. T. M. penetration of 300 at 77° F. and when applied to a smooth metal surface is virtually unremovable by ordinary means.

EXAMPLE 2

40 parts of a calcium soap grease prepared from animal fat, hydrated lime, water and a mineral lubricating oil having a viscosity of 300 at 100° F. was blended with 50 parts of a petroleum hydrocarbon resin having a viscosity of 3050 at 210° F. at 100° F. The resulting grease analyzed as follows:

|  | Percent |
|---|---|
| Calcium soap | 6.7 |
| Petroleum hydrocarbon resin | 55.5 |
| Low cold test lubricating oil, 300 vis./100 F. | 37.3 |
| Water | 0.5 |

Penetration 310 at 77° F.
Viscosity of mineral oil approximately 500 seconds S. U. V. at 210° F.

EXAMPLE 3

|  | Percent |
|---|---|
| Lard oil | 26.5 |
| Magnesium hydroxide | 1.5 |
| Hydrated lime | 2.0 |
| Water | 1.0 |
| Petroleum hydrocarbon resin 3000 vis./210° F. | 42.0 |
| Low cold test mineral lubricating oil 300 viscosity at 100° F. | 27.0 |

The lard oil was heated to 250–300° F. and saponified with the magnesium hydroxide and hydrated lime. The mineral oil was then added and the mixture cooled to 210° F. and water added and stirred until the grease structure formed. The petroleum hydrocarbon resin was then blended into the grease at 205° F.

EXAMPLE 4

|  | Percent |
|---|---|
| Oleic acid | 6.00 |
| Hydrated lime | 0.78 |
| Low cold test mineral lubricating oil 500 seconds viscosity at 100° F. | 24.00 |
| Petroleum hydrocarbon resin, 1700 seconds viscosity at 210° F. | 69.22 |

The resin and the oleic acid were added to a steam jacketed kettle equipped with mixing paddles and the temperature raised to 160° F. The lime dispensed in the low cold test lubricating oil was added and agitation continued and the temperature held at 160–170° F. for ½ hour. The grease formed had an A. S. T. M. worked penetration of 320, and extreme adhesiveness to clean, wet, metal surfaces. The viscosity of the extracted blend of petroleum resin and lubricating oil was found to be 575 seconds at 210° F.

What is claimed is:

1. A composition of matter comprising a metallic soap grease and petroleum hydrocarbon propane precipitated residual resins having a viscosity index of over 60.

2. A composition of matter comprising a metallic soap grease and solvent precipitated petroleum hydrocarbon natural residual resins having a viscosity of from 900 to 3500 at 210° F., having a viscosity index of over 60.

3. A composition of matter comprising a metallic soap, water, a lubricating distillate of petroleum oil and petroleum hydrocarbon propane precipitated residual resins having a viscosity index of over 60.

4. A composition of matter comprising a calcium soap, water, a lubricating distillate of petroleum oil and solvent precipitated petroleum hydrocarbon natural residual resins having a viscosity index of over 60.

5. A composition of matter comprising an anhydrous sodium soap, a lubricating distillate of petroleum oil and petroleum hydrocarbon propane precipitated residual resins, having a viscosity index of over 60.

6. A composition of matter comprising a mixed metallic soap grease and solvent precipitated petroleum hydrocarbon natural residual resins, having a viscosity index of over 60.

7. A composition of matter comprising 100 parts by weight of a metallic soap grease and from 1 to 150 parts by weight of petroleum hydrocarbon propane precipitated residual resins, having a viscosity index of over 60.

8. A composition of matter comprising 100 parts by weight of metallic soap grease and from 1 to 150 parts by weight of petroleum hydrocarbon natural residual resins having a viscosity of from 900 to 3500 at 310° F., having a viscosity index of over 60.

9. A lubricant containing metallic soap, mineral oil and high V. I. petroleum hydrocarbon propane precipitated residual resins the metallic soap being dispersed in the mineral oil to form a solid grease product.

10. A lubricant consisting of metallic soap, mineral oil and high V. I. solvent precipitated petroleum hydrocarbon natural residual resins and having an apparent viscosity of over 50 poises at 100,000 reciprocal seconds rate of shear at 77° F.

JOHN C. ZIMMER.
ARNOLD J. MORWAY.